G. GIEM.
ARMORED VEHICLE.
APPLICATION FILED MAR. 11, 1915.
1,149,127.
Patented Aug. 3, 1915.
2 SHEETS—SHEET 1.
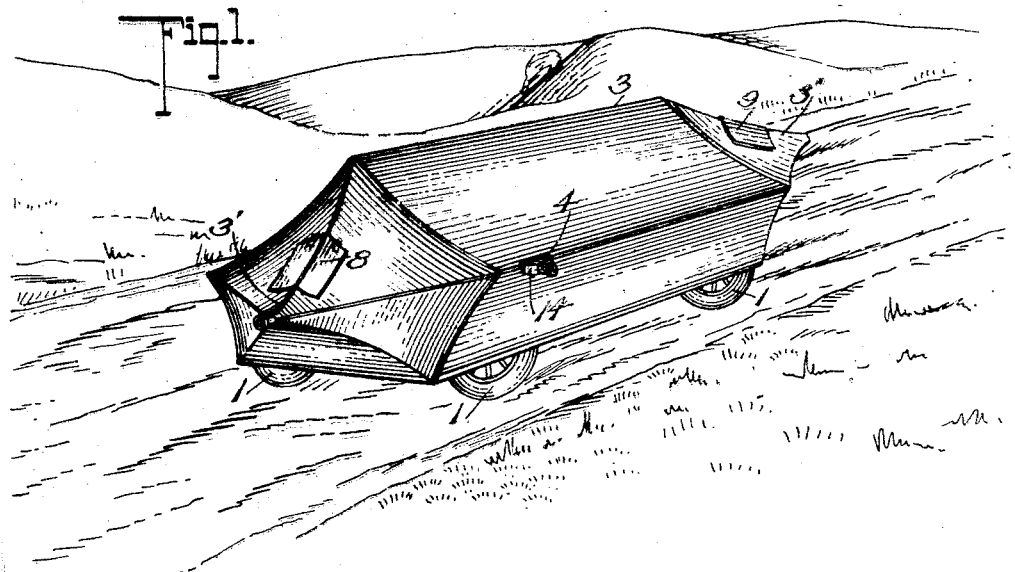
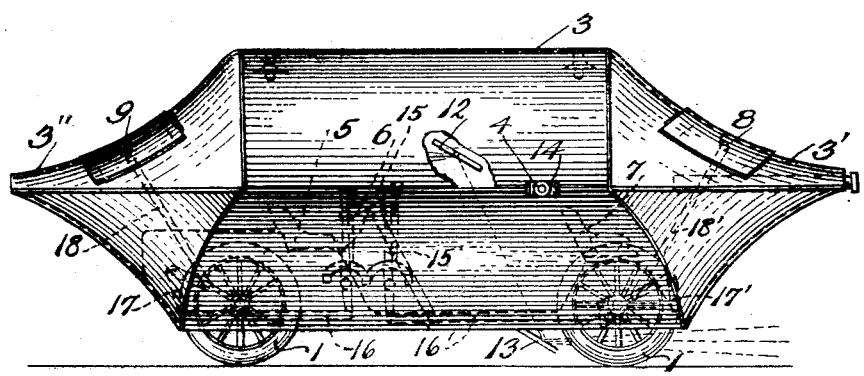
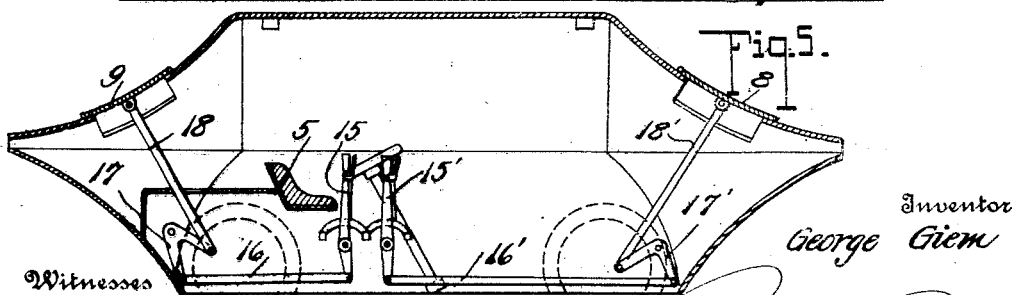
Inventor
George Giem

G. GIEM.
ARMORED VEHICLE.
APPLICATION FILED MAR. 11, 1915.

1,149,127.

Patented Aug. 3, 1915.
2 SHEETS—SHEET 2.

Witnesses
C. H. Wagner,
A. R. Whittington.

Inventor
George Giem
By Robb & Robb
Attorneys

UNITED STATES PATENT OFFICE.

GEORGE GIEM, OF PALMER LAKE, COLORADO.

ARMORED VEHICLE.

1,149,127.  Specification of Letters Patent. Patented Aug. 3, 1915.

Application filed March 11, 1915. Serial No. 13,726.

*To all whom it may concern:*

Be it known that I, GEORGE GIEM, a citizen of the United States, residing at Palmer Lake, in the county of El Paso and State of Colorado, have invented certain new and useful Improvements in Armored Vehicles, of which the following is a specification.

The present invention relates to improvements in armored vehicles, the characteristic feature of which lies in the formation of the body therefor of poly-sided construction such that objects, for example bullets or similar missiles, directed thereagainst, will be deflected therefrom along paths tangent to a median plane passing through said vehicle body.

The advantages of the arrangement are mainly that the surface of the body presents the very minimum of points where missiles would have a tendency to penetrate by direct impact, as well as insuring a shunting or deflecting of the objects in directions likely to do the least harm, thereby protecting not only the vehicle and its operators during offensive operations, but also surrounding objects whether they be troops or other vehicles.

Another object in view is to provide an armored vehicle of the above type with protective machine guns so disposed within the body as to project therefrom at the meeting angles where least likely to be damaged by missiles.

These and such other objects as may hereinafter appear are attained by the novel construction, combination and arrangement of parts to be hereinafter specifically described and claimed.

Reference will now be had to the accompanying drawings forming a part of this specification, wherein:—

Figure 3:
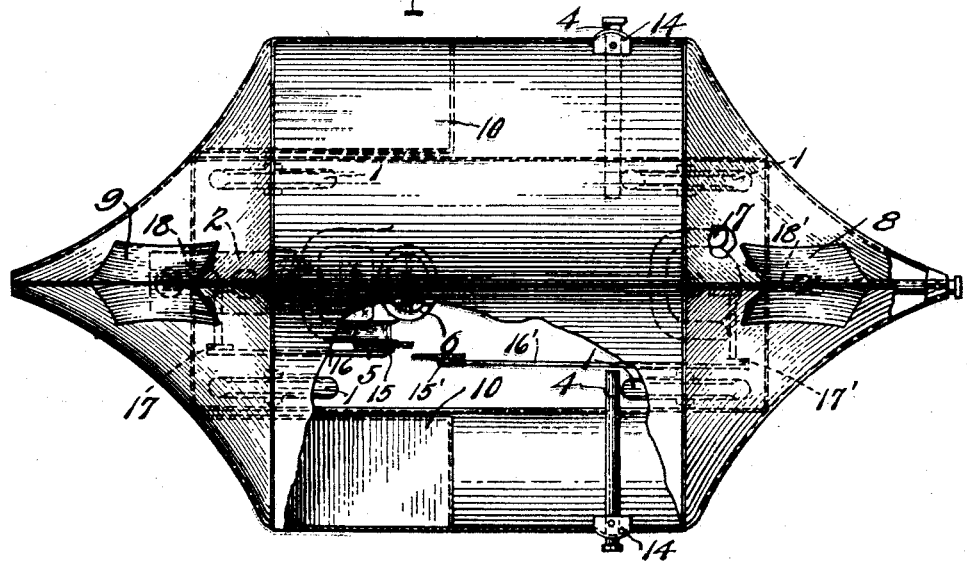
Figure 4:
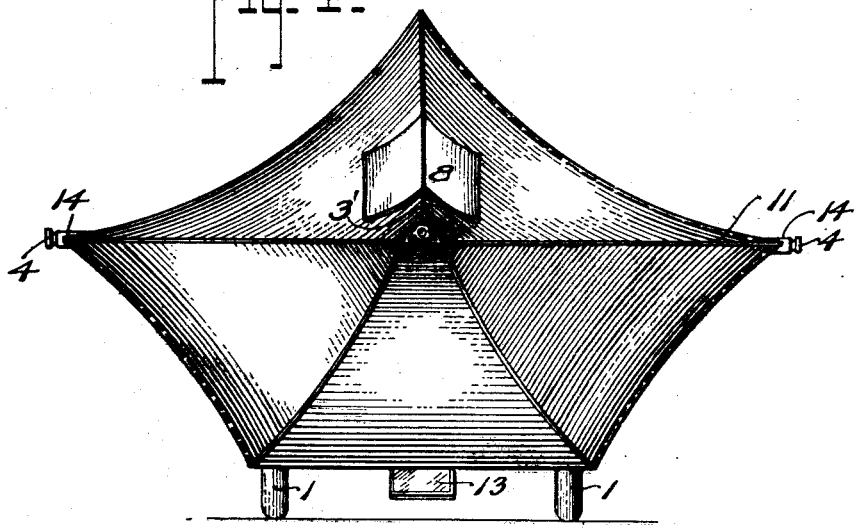

Figure 1 is a perspective view of a vehicle embodying my special form of armor. Fig. 2 is a side elevation thereof, partly broken away to show the interior reflector means for steering the vehicle. Fig. 3 is a top plan view partly broken away and showing more clearly the details of construction. Fig. 4 is a front elevation of the machine. Fig. 5 is a longitudinal sectional view through my vehicle and showing more clearly the operating mechanism for the doors thereof.

Specifically describing the invention and referring to the drawing, it will be observed that the machine is of self-propelling type involving the wheels 1 and the motor 2 for driving the vehicle. The said vehicle is inclosed by a shell or body 3 which is specially formed with a view to properly protecting the occupants thereof during manipulation of machine guns such as indicated at 4 and mounted within said body. I preferably arrange at the rear portion of the vehicle a driver's seat 5 adjacent to which is disposed a steering wheel 6, while at the forward portion of the machine is a movable seat 7 convenient to the guns 4 hereinbefore mentioned. It will be noted that the body at its forward or prow end is provided with a trap door or cover 8 and a similar door 9 is disposed adjacent to the rear extremity for convenient access to the interior of the body.

At 10 are disposed ammunition receptacles, said receptacles being disposed at opposite sides of the body adjacent to the rear portion thereof.

The special shell or body 3 is formed of many sides, the sides being concave in construction and meeting at the median horizontal plane 11. The surface of each one of these sides is curved on an arc which is tangent to said median plane 11 so that a missile striking said side will be deflected if above the plane in an upward direction and if below the plane in a downward direction. The curvature of the sides is such that the missiles will take a path directly upward or downward, as the case may be, and therefore would be incapable of damaging the running gear and unlikely to glance from said body in a direction which would injure surrounding vehicles or troops.

At the forward end the shell is formed with a prow designated 3′, said prow being many-sided in formation and converging to a point. The rear extremity 3″ of the body is similarly constructed and the deflecting surfaces are adapted to impart deflection to missiles striking the same in the manner indicated with respect to the main portion of the body as before described. The body preferably is open at the bottom and in order that the driver of the vehicle may steer the same a reflector 12 is disposed centrally of the body in front of the operator and coacts with a second reflecting element 13 arranged at the bottom of the body and extending beneath the same. The path of movement of the vehicle is reflected upon the upper surface of the member 13 and from there to the rear surface of the upper member 12 so that the operator is able to control the advance in an adequate manner. It will be further noted that the guns 4 are pivotally mounted on turn tables 14 disposed in suitable openings in the body, at opposite sides thereof, said openings being located at the median plane 11 hereinbefore referred to and of a size sufficient to enable the pivotal swinging of the guns through an arc for directing the same through a wide angle. The forward gun is disposed in the prow 3' and extends through one opening at the converging extremity, said gun being similarly movable and by reason of its special location is protected against damage to the greatest extent, as is also true with respect to the other guns.

The turn tables 14 above referred to perform the advantageous function of protecting the opening, or more strictly speaking, maintaining said opening closed during the swinging of the gun on which it is mounted, the operator being thereby protected to best advantage, as will be appreciated.

It will be obvious from the foregoing description that missiles directed against the machine forming the embodiment of this invention will be able only to strike a glancing blow and will be effectively deflected in an advantageous manner.

As shown more particularly in Fig. 5 I preferably arrange adjacent to the operator's seat 5, certain operating levers 15, 15' the former connected by a link 16 to a bell crank lever 17 pivotally mounted at the rear of the machine and in turn connected by the lifting bar 18 to the trap door 9. The lever 15' is similarly connected by the link 16' through the lever 17' and rod 18' to the door 8. Thus, when the car is moving through a zone of safety the operator may readily raise one or both doors to give him a clear view from within the shell or body for operating the vehicle.

Having thus described the invention, what is claimed is:—

1. An armored vehicle of the class described comprising, in combination, a many-sided body, said sides diverging upwardly and downwardly from a median plane passing through the body and being of concave formation.

2. An armored vehicle of the class described, comprising, in combination, a polygonal body, the central portion consisting of opposite sides diverging from a median plane and of concave formation, and extremities converging from the ends of the sides aforesaid to a meeting point in the said plane and also of concave formation.

3. A vehicle of the class described comprising, in combination, self propelling means, a shell inclosing the vehicle and formed of many sides, said sides diverging from median planes passing horizontally and vertically through the body, guns arranged in said body at the median horizontal plane above referred to, and means for guiding the movement of said vehicle from its interior.

4. A vehicle of the class described comprising, in combination, self propelling means, a body inclosing the vehicle and formed of many sides, each side being of concave construction diverging from a horizontal median plane passing through the body, said body having openings at the median line, guns disposed in the body and pivotally mounted for movement in the openings aforesaid, said body having tapering extremities, said extremities being each formed of many sides and converging to a point.

In testimony whereof I affix my signature in presence of two witnesses.

GEORGE GIEM.

Witnesses:
 E. K. ROBINETT,
 JAMES A. ORR.

Copies of this patent may be obtained for five cents each, by addressing the "Commissioner of Patents, Washington, D. C."